United States Patent [19]

Allen

[11] Patent Number: 4,663,378
[45] Date of Patent: May 5, 1987

[54] SILICONE-MODIFIED POLYETHERMIDES
[75] Inventor: Deborah L. Allen, Dalton, Mass.
[73] Assignee: General Electric Company, Pittsfield, Mass.
[21] Appl. No.: 794,259
[22] Filed: Nov. 1, 1985

Related U.S. Application Data

[63] Continuation of Ser. No. 566,660, Dec. 29, 1983, abandoned.

[51] Int. Cl.$^4$ .................................................. C08K 5/54
[52] U.S. Cl. ........................................ 524/267; 524/600
[58] Field of Search ............................... 524/267, 600

[56] References Cited

U.S. PATENT DOCUMENTS

| | | | |
|---|---|---|---|
| 2,558,584 | 6/1951 | Safford | 524/267 |
| 3,440,203 | 4/1969 | Boldebuck et al. | 524/267 |
| 3,847,867 | 11/1974 | Heath et al. | 260/47 CP |
| 3,847,869 | 11/1974 | Williams | 260/47 CZ |
| 3,850,885 | 11/1974 | Takekoshi et al. | 260/47 CZ |
| 3,852,242 | 12/1974 | White | 260/47 CZ |
| 3,855,178 | 12/1974 | White et al. | 260/45.7 S |
| 3,909,475 | 9/1975 | Schneider | 524/267 |
| 3,983,093 | 9/1976 | Williams, III et al. | 524/600 |
| 4,390,651 | 6/1983 | Brown, Jr. | 524/267 |
| 4,419,484 | 12/1983 | Sattlegger et al. | 524/267 |
| 4,446,090 | 5/1984 | Lovgren et al. | 524/267 |

FOREIGN PATENT DOCUMENTS 257010 4/1970 U.S.S.R.

OTHER PUBLICATIONS

Koton, M. M. and Florinski, F. S., *Zh. Org. Khin.*, 4(5):774 (1968).

*Primary Examiner*—Morton Foelak
*Assistant Examiner*—M. L. Moore
*Attorney, Agent, or Firm*—Bernard, Rothwell & Brown

[57] ABSTRACT

A silicone modified polyetherimide which contains a polyetherimide and a flow-modifying amount of a polyorganosiloxane. Modification of polyetherimides in accordance with this invention results in lower torsional forces and increased throughput rates in extrusion and injection molding operations.

9 Claims, No Drawings

SILICONE-MODIFIED POLYETHERMIDES

This is a continuation of application Ser. No. 566,660 filed Dec. 29, 1983 now abandoned.

BACKGROUND OF THE INVENTION

The present invention relates to silicone modified polyetherimides. More particularly, the invention relates to silicone modified polyetherimides having improved processing characteristics and mechanical properties.

Polyetherimides are unique polymers which exhibit superior physical and chemical properties, including high heat resistance, exceptional strength and excellent processability. These polymers can be used as wire coatings and are particularly suited for injection molding applications. Polyetherimides are conventionally made by reacting an aromatic bis(ether anhydride) with an organic diamine. Present manufacturing practices include solution polymerization or melt polymerization techniques or combinations of the two, as hereinafter described.

Polyetherimide resins are available commercially in the form of pellets. These pellets can be formed by fabrication into finished articles of widely varying shapes and sizes. Such articles are typically formed by extrusion or injection molding. Because of the high glass transition temperatures associated with polyetherimides, extrusion and injection molding requires elevated temperatures, and apparatus capable of withstanding large forces.

One means for reducing the forces required for extrusion and injection molding of conventional plastics is to incorporate lubricating compounds into the resin. Such lubricating compounds are thought to decrease frictional forces and also to modify the heat resistance of the resin. Throughput rates can be increased substantially by employing lubricating compounds, but the mechanical and physical properties of the plastic (such as strength and heat deflection temperature) are often adversely affected.

An important requirement for lubricants or flow modifiers to be used with polyetherimides is that they be resistant to elevated temperatures. As mentioned above, polyetherimides have high glass transition temperatures. This property is advantageous, because it permits the polymers to be used in high temperature applications. As a result of these high glass transition temperatures, processing temperatures are considerably higher for polyetherimides than for other plastics, and therefore, additives used with polyetherimides must have good heat resistance.

An additional requirement for lubricants and flow modifiers is that they be compatible with the polymer to which they are added. Such compatibility is evidence by clarity or homogeneity of the resulting plastic. Incompatible mixtures might be cloudy or contain streaks or blotches.

Silicone oils and gums have been used as flow modifiers or lubricants for polymers such as polyesters, polyethylene, polypropylene, polyvinylchloride and the like. Heretofore, the use of additives to improve the extrusion or injection molding characteristics of polyetherimides has not been reported.

SUMMARY OF THE INVENTION

In accordance with the present invention, silicone modified polyetherimides comprise a polyetherimide and a flow modifying amount of a polyorganosiloxane.

Polyorganosiloxanes, commonly called silicone fluids or gums, have been found to substantially improve the flow characteristics of polyetherimides. Extrusion rates can in some cases be doubled by incorporating small amounts of a polyorganosiloxane into the polymer. Moreover, these materials have not only been found to be compatible with the polyetherimides, but most surprisingly, have also been found to improve some mechanical properties.

DETAILED DESCRIPTION OF THE INVENTION

The blends of the invention include a polyetherimide of the formula:

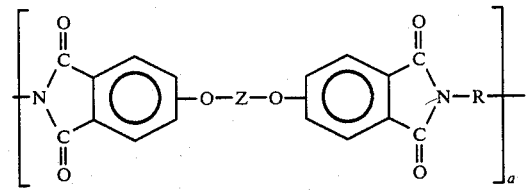

where "a" represents a whole number in excess of 1, e.g., 10 to 10,000 or more, Z is a member selected from the class consisting of (1):

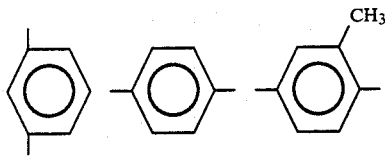

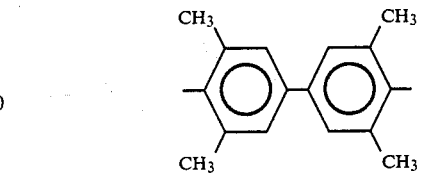

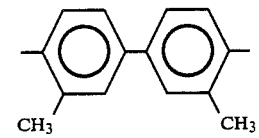

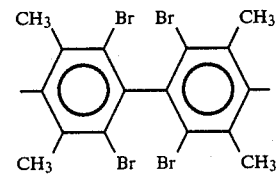

-continued

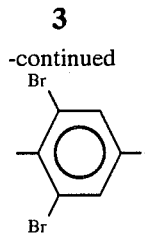

and (2) divalent organic radicals of the general formula:

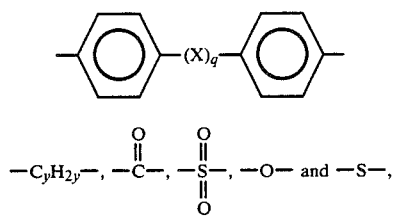

where q is 0 or 1, y is a whole number from 1 to 5, and divalent bonds of the —O—Z—O— radical are situated on the phthalic anhydride end groups, e.g., in the 3,3', 3,4', 4,3' or the 4,4' positions and R is a divalent organic radical selected from the class consisting of aromatic hydrocarbon radicals having from 6 to about 20 carbon atoms and halogenated derivatives thereof, alkylene radicals and cycloalkylene radicals having from about 2 to about 20 carbon atoms, $C_{(2-8)}$ alkylene terminated polydiorganosiloxane, and divalent radicals of the formula:

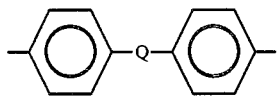

where Q is a member selected from the class consisting of

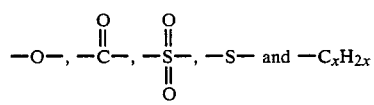

where x is a whole number from 0 to 5 inclusive.

The polyetherimides can be obtained by any of the methods well known to those skilled in the art including the reaction of an aromatic bis(ether anhydride) of the formula

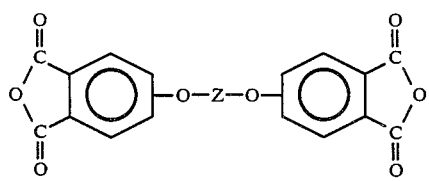

where Z is as defined hereinbefore with an organic diamine of the formula: $H_2N—R—NH_2$
where R is as defined hereinbefore.

Aromatic bis(ether anhydride)s of the above formula include, for example, 2,-bis[4-(2,3-dicarboxy-phenoxy)phenyl]phenyl]-propane dianhydride; 4,4'-bis(2,-3-dicarboxyphenoxy)diphenyl ether dianhydride; 1,3-bis(2,3 dicarboxyphenoxy)benzene dianhydride; 4,4'-bis(2,3-dicarboxyphenoxy)benzene dianhydride; 4,4'-bis(2,3-dicarboxyphenoxy)benzophenone dianhydride; 4,4'-bis(2,3-dicarboxyphenoxy)diphenyl sulfone dianhydride; 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'-(3,4-dicarboxyphenoxy)diphenyl-2,2-propane dianhydride; etc. and mixtures of such dianhydrides.

In addition, aromatic bis(ether anhydride)s also included in the above formulas are shown by Koton, M. M.; Florinski, F. S.; Bessonov, M. I.; Rudakov, A. P. (Institute of Heteroorganic compounds, Academy of Sciences, U.S.S.R.), U.S.S.R. 257,010, Nov. 11, 1969, May 3, 1967. In addition, dianhydrides are shown by M. M. Koton, F. S. Florinski, Zh. Org. Khin., 4(5), 774 (1968).

Organic diamines of the above formulas include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphenyl ether, 1,5-diaminonaphthalene, 3,3'-dimethylbenzidine, 3,3'-dimethoxybenzidine, 2,4-bis(β-amino-t-butyl)toluene, bis(p-β-amino-t-butylphenyl)ether, bis(p-β-methyl-o-aminopentyl)benzene, 1,3-diaminotoluene, 2,6-diaminotoluene, bis(4-aminocyclohexyl)methane, 3-methylheptamethylenediamine, 4,4 dimethylheptamethylenediamine, 2,11-dodecanediamine, 2,2-dimethylpropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylendiamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylendediamine, bis(3-aminopropyl)tetramethyldisiloxane, bis(4-aminobutyl)tetramethyldisiloxane, etc.

In general, the reactions can be advantageously carried out employing well-known solvents, e.g., o-dichlorobenzene, m-cresol/toluene, etc. in which to effect interaction between the dianhydrides and the diamines, at temperatures of from about 100° C. to about 250° C. Alternatively, the polyetherimides can be prepared by melt polymerization of any of the above dianhydrides with any of the above diamino compounds while heating the mixture of the ingredients at elevated temperatures with concurrent intermixing. Generally, melt polymerization temperatures between about 200° C. to 400° C. or higher are employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mole percent) of diamine can be employed, resulting in the production of polyetherimides having terminal amine groups. Generally, useful polyetherimides have an intrinsic viscosity greater than 0.2 deciliters per gram, preferably 0.35 to 0.60, or 0.7 deciliters per gram or even higher when measured in m-cresol at 25° C.

Included in the many methods of making the polyetherimides are those disclosed in U.S. Pat. Nos. to Heath et al, 3,847,867, Williams 3,847,869, Takekoshi et al. 3,850,885, White 3,852,242 and 3,855,178, etc. These disclosures are incoporated herein in their entirety by reference for the purpose of teaching, by way of illustration, general and specific methods for preparing polyetherimides suitable for the blends of this invention.

The silicone modified polyetherimides of this invention includes a flow-modifying amount of a polyorganosiloxane. The polyorganosiloxanes employed in these compositions include a broad range of well known silicone fluids and gums.

Silicones are a family of synthetic polymers which are partly organic and partly inorganic. They have a quartz-like polymer structure made up of alternating silicon and oxygen atoms rather than the carbon-to-carbon backbone characteristic of organic polymers. It is this Si—O linkage that contributes to the outstanding properties when combined with polyetherimides.

Typically, the silicon atoms will have one or more side groups attached, generally phenyl, methyl or vinyl moieties. Alkyl, aryl and other reactive groups on the silicon atom are also possible.

The polyorganosiloxanes employed in these blends are silicone gums or fluids having viscosities in excess of about 15 centipoise, preferably in excess of about 100 centipoise and which are not substantially volatile at polyetherimide processing temperatures. Some of the silicone gums contemplated for this invention have viscosities substantially in excess of $10^6$ centipoise. Specific examples of polyoganosiloxanes that are included are those of the structural formula:

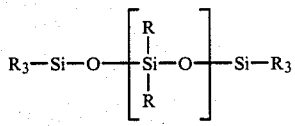

wherein m is an integer sufficiently high to provide the desired viscosity; R is radical independently selected from such groups such as hydrogen, lower alkyl hving 1 1 to 6 carbon atoms, lower fluoroalkyls having 1 to 6 carbon atoms, phenyl, substituted phenyl, vinyl, halogen, lower alkoxy of from 1 to about 6 carbon atoms, lower acyloxy of from 1 to about 6 carbon atoms, and lower alkylamino of from 1 to about 6 carbon atoms; and $R_3$ is a radical independently selected from such groups as methyl, hydroxy and vinyl. Preferably R is independently selected from the group of radicals consisting of lower alkyls having 1 to about 3 carbon atoms, lower fluoroalkyls having 1 to about 3 carbon atoms, and phenyl and $R_3$ is either methyl or hydroxy. Those polymers in which the R groups are different from one another may be random or block copolymers.

In preferred polyorganosiloxanes, a substantial portion, e.g., from about 3 to about 60 mole percent, preferably from about 4 to about 50 mole percent of the R groups of the above formula are phenyl or substituted phenyl. Such phenyl substituted polyorganosiloxanes have been found to have good heat resistance and have good compatability with polyetherimides. For example, SE52, a preferred silicone gum, contains about 5.3 mole percent of the diphenyl moiety.

In addition to the linear polyorganosiloxane polymers depicted above, cyclic and crosslinked polyorganosiloxanes may also be employed; however, cyclic polyorganosiloxanes tend to be more volatile than the preferred linear polyorganosiloxanes.

Flow-modifying amounts of these polyorganosiloxanes are, in general, amounts which significantly improve the flow rate in conventional extrusion or injection molding operations, or reduce the energy required for such operations. These amounts typically range from about 0.1 to about 5 wt. % of the polyorganosiloxane based on the total weight of the silicone modified polymer, and preferably range from about 1 to about 3 wt. %. The polyorganosiloxanes can be added to the polyetherimides during the production process or may be blended with the polyetherimide resin by melt blending or solution blending.

Flow rates in conventional extrusion apparatus have been as much as doubled by modifying polyetherimides as described herein. The polyorganosiloxanes are quite compatible with the polyetherimides, as evidenced by homogeneous films produced by solution blending procedures.

Surprisingly, mechanical and physical properties of the polyetherimides are not signficantly adversely affected by their modification with minor amounts of polyorganosiloxanes, and in fact, impact strength of the polymers have, in some cases, been improved.

The invention is further illustrated by the following examples, which are not intended to be limiting.

EXAMPLE I

Blends of a commercially available polyetherimide sold under the trademark ULTEM ® by General Electric Company, Pittsfield, Mass. USA with several polyorganosiloxanes were prepared by solution blending techniques. The polyetherimide used had the following structural formula:

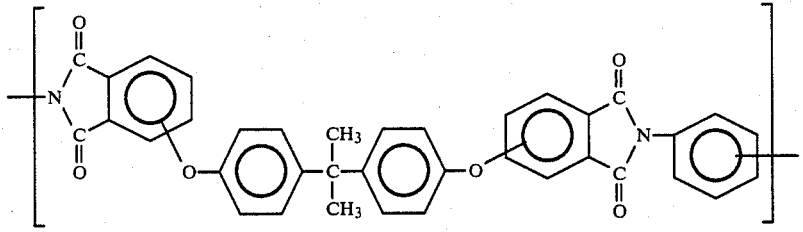

Ten percent solutions of the polyorganosiloxane and polyetherimide were prepared in chloroform. Thin films of the blended polymers were deposited on Mylar ® sheets by spreading a small aliquot of the solution and evaporating the solvent. These films were then peeled from the Mylar sheets and observed for clarity and homogeneity. These tests demonstrated good compatibility between the polyetherimide and the following polyorganosiloxanes.

| Commercial* Designation | Chemical Name | Viscosities |
| --- | --- | --- |
| SE-52 | polydimethyldiphenyl siloxane gum having low phenyl content | 100-500 penetration |
| CF-1142 | polydimethyldiphenyl siloxane | — |
| SF-1153 | trimethyl stopped polydimethyldiphenyl siloxane fluid having low phenyl content | 90–125 cps @ 25° C. |
| SF-1154 | trimethyl stopped polydimethyldiphenyl siloxane fluid having medium phenyl content | 190 cps @ 25° C. |
| SF-1179 | trimethyl stopped polydimethyldiphenyl siloxane fluid having high phenyl content | — |
| SF-1023 | silanol stopped polydimethyldiphenyl siloxane fluid having medium phenyl content | 50 cps @ 25° C. |
| SF-96-100 | trimethyl stopped polydimethylsiloxane fluid | 100 cps @ 25° C. |
| DF-1040 | trimethyl stopped methyl hydrogen polysiloxane fluid | 15–40 cps @ 25° C. |

*Each of these polyorganosiloxanes is available from Silicone Products Department, General Electric Company, Waterford, New York 12188 USA.

EXAMPLE II

A blend of the polyetherimide described in Example I with 2% by wt. of the polyorganosiloxane designated SF-1023 was prepared by melt blending and coextrusion. The unmodified polyetherimide was used as a control in both the virgin and reextruded forms. The resulting resin was extruded or injection molded into various shapes for mechanical testing. Under the same conditions, the silicone modified resin extruded at twice the rate of the unmodified resin. The results of this experiment are shown in Table I. Heat deflection temperatures (HDT) were determined by injection molding a $\frac{1}{8}''$ thick (0.32 cm), $\frac{1}{2}''$ wide (1.27 cm), 5" (12.7 cm) long bar. This bar was supported at each end, and a 264 psi (1.82 megapascals) force was applied to the middle of the bar. Temperature was gradually increased, and the temperature which resulted in a 0.01 inch (0.254 mm) deflection of the bar was recorded.

The Gardner impact strength was determined by injection molding the resin into a plaque approximately 2" (5 cm) square and $\frac{1}{8}''$ (0.32 cm) thick. Darts were dropped onto the plaques from varying heights and the weight times distance of fall which resulted in breakage was recorded.

Izod impact strength (ASTM D256) was determined by injection molding test bars having the following dimensions: $2\frac{1}{2}''(6.4$ cm$)\times\frac{1}{2}''(1.3$ cm$)\times\frac{1}{8}''(0.32$ cm$)$. Notched and unnotched bars were tested in the conventional manner with a swinging pendulum, and the breaking strengths recorded.

Tensile strength was measured by injection molding test bars being $\frac{1}{8}''$ thick Type I tensile bar (see ASTM D 638-77a). These bars were pulled apart using an Instron tester which applies a gradually increasing tensile force until breakage occurs.

Flexural properties (ASTM D790) were determined by injection molding test bars having the following dimensions: $5''(12.7$ cm$)\times\frac{1}{2}''(1.27$ cm$)\times\frac{1}{4}''(0.64$ cm$)$. These test bars were supported by each end in an Instron tester and increasing forces applied to the center of ahe bar. Modulus, 5% strain strength and ultimate strength were calculated in the conventional manner.

TABLE I

| Sample | HDT °C. | Gardner Impact in-lb | Izod Impact ft.-lb/in | | Tensile Properties % Elongation/ $10^4$ psi | Flexural Properties (PSI) | | |
| --- | --- | --- | --- | --- | --- | --- | --- | --- |
| | | | notch | no notch | | Modulus | 5% Strain Strength | Ultimate Strength |
| Polyetherimide (reextruded) | 201 | 38 | .9 | 1.3 | 15%/1.5  21%/1.3 | $4.8 \times 10^5$ | $1.8 \times 10^4$ | $2.1 \times 10^4$ |
| Polyetherimide (virgin) | 201 | 45.8 | .9 | 1.9 | 15%/1.5  25%/1.3 | $4.4 \times 10^5$ | $1.8 \times 10^4$ | $2.1 \times 10^4$ |
| Silicone Modified Polyetherimide | 200 | 21.3 | 1.3 | 1.3 | *  15%/1.5 | $4.3 \times 10^5$ | $1.8 \times 10^4$ | $2.1 \times 10^4$ |

*Sample failed at yield point

These tests demonstrated that modifying polyetherimides with silicones substantially improves extrusion and injection molding characteristics, and does not significantly adversely affect the mechanical properties of the polymers. In fact, impact strength of the polymer was actually improved.

I claim:

1. A silicone modified polyetherimide comprising a blend of a polyetherimide and a flow-modifying amount of a polyorganosiloxane, wherein said polyetherimide is of the formula:

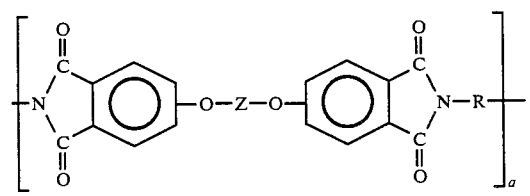

where "a" represents a whole number in excess of 1, Z is a member selected from the class consisting of (1):

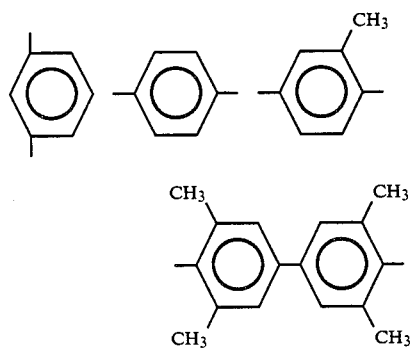

-continued

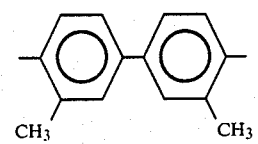

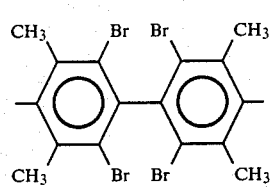

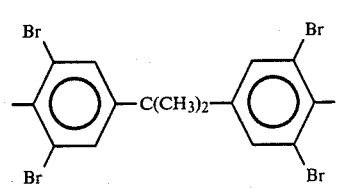

and (2) divalent organic radicals of the general formula

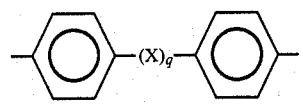

where X is a member selected from the class consisting of divalent radicals of the formulas,

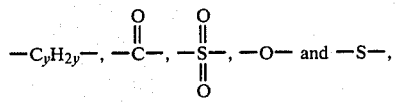

where q is 0 or 1, y is a whole number from 0 to 5, and divalent bonds of the —O—Z—O— radical are situated on the phthalic anhydride end groups in the 3,3', 3,4', 4,3' or the 4,4' positions and R is a divalent organic radical selected from the class consisting of aromatic hydrocarbon radicals having from 6 to about 20 carbon atoms and halogenated derivatives thereof, alkylene radicals and cycloalkylene radicals having from about 2 to about 20 carbon atoms, $C_{(2-8)}$alkylene terminated polydiorganosiloxane, and divalent radicals of the formula:

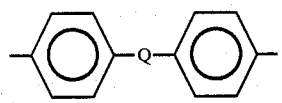

where Q is a member selected from the class consisting of

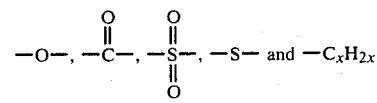

where x is a whole number from 1 to 5 inclusive.

2. The silicone modified polyetherimide of claim 1, wherein the polyorganosiloxane has a viscosity in excess of about 15 centipoise and has the following formula:

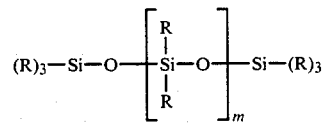

where m is an integer sufficiently high to provide said viscosity; R is a radical that is independently selected from the groups consisting of hydrogen, lower alkyl having 1 to 6 carbon atoms, lower fluoroalkyl having 1 to 6 carbon atoms, phenyl, substituted phenyl, vinyl, halogen, lower alkoxy of from 1 to about 6 carbon atoms and $R_3$ is a radical independently selected from methyl, hydroxy and vinyl.

3. The silicone modified polyetherimide of claim 2, wherein the viscosity of the polyorganosiloxane is in excess of about 100 centipoise and the R groups are selected from the group consisting of lower alkyl of from 1 to about 3 carbon atoms, lower fluoroalkyl of from 1 to about 3 carbon atoms, phenyl or vinyl.

4. The silicone modified polyetherimide of in claim 2, wherein a minor portion of the R groups are hydrogen, halogen, lower alkoxy from 1 to about 6 carbon atoms, lower acyloxy from 1 to about 6 carbon atoms or lower alkylamino of from 1 to about 6 carbon atoms.

5. The silicone modified polyetherimide of claim 2, wherein from about 3 to about 60 mole % of the R groups are phenyl.

6. The silicone modified polyetherimide of claim 2, wherein from about 4 to about 50 mole % of the R groups are phenyl.

7. The silicone modified polyetherimide of claim 3, wherein the polyorganosiloxane is polydimethylsiloxane or polydimethyldiphenylsiloxane.

8. The silicone modified polyetherimide of claim 1, wherein the polyorganosiloxane is a cyclic or crosslinked polyorganosiloxane.

9. The silicone modified polyetherimide of claim 1, wherein, in the polyetherimide, —Z— is:

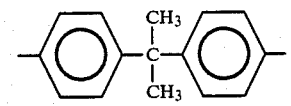

and R is m-phenylene.

* * * * *

UNITED STATES PATENT AND TRADEMARK OFFICE
CERTIFICATE OF CORRECTION

PATENT NO. : 4,663,378
DATED : May 5, 1987
INVENTOR(S) : Deborah L. Allen

It is certified that error appears in the above-identified patent and that said Letters Patent is hereby corrected as shown below:

Column 5, line 47, "11" should read -- 1 --.

Signed and Sealed this

Nineteenth Day of January, 1988

*Attest:*

DONALD J. QUIGG

*Attesting Officer*  *Commissioner of Patents and Trademarks*